Oct. 4, 1955   W. SUMMERVILLE ET AL   2,719,556
STRAW CUTTING ATTACHMENT FOR COMBINES
Filed July 3, 1952   2 Sheets-Sheet 1

INVENTOR.
WILLIAM SUMMERVILLE
BY WALTER LEINEN
Merchant & Merchant
ATTORNEYS

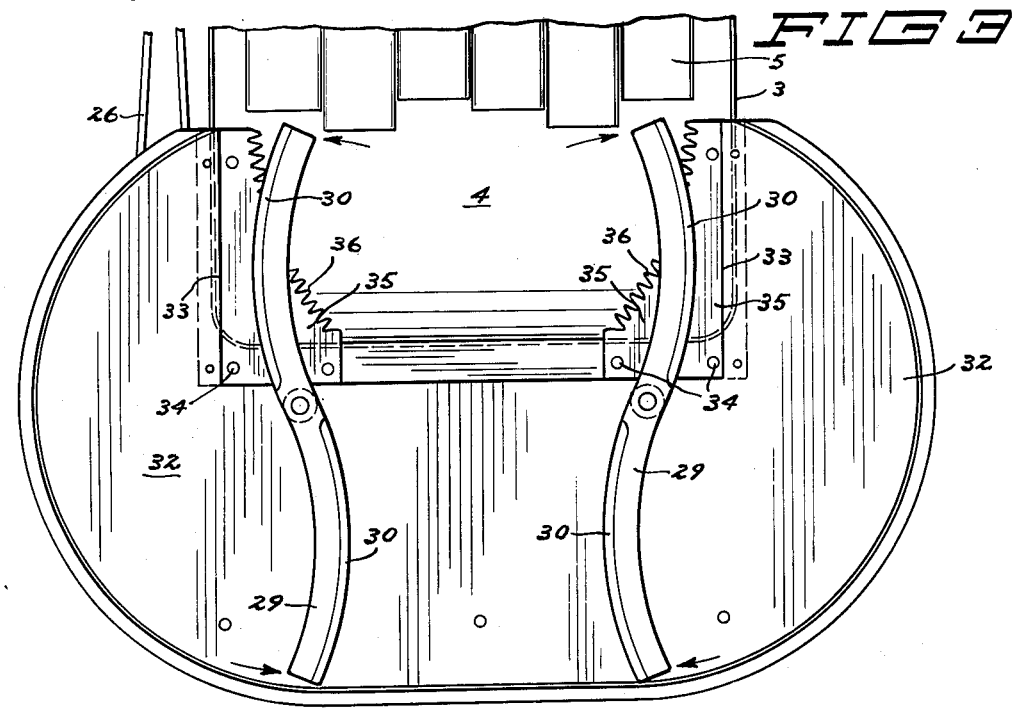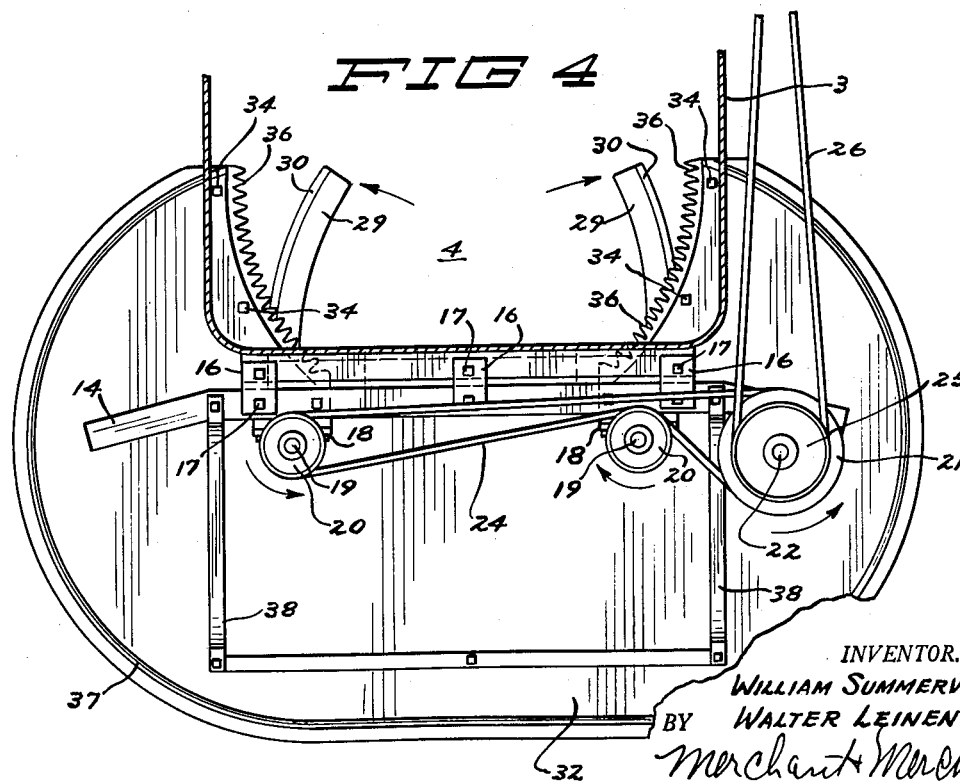

| United States Patent Office | 2,719,556 |
|---|---|
| | Patented Oct. 4, 1955 |

2,719,556

STRAW CUTTING ATTACHMENT FOR COMBINES

William Summerville and Walter Leinen,
Breckenridge, Minn.

Application July 3, 1952, Serial No. 297,138

1 Claim. (Cl. 146—108)

Our invention relates to straw breaking attachments for combines and the like and has for its object the provision of such a device which may be readily attached to combines of various makes.

It has been found that straw which has been torn or shredded so as to leave jagged edges, decomposes much more rapidly than does straw which has merely been cleanly cut.

The primary object of our invention is the provision of an attachment for combines which will break and shred the straw, as distinguished from cleanly cutting the same, so as to more rapidly increase the fertility of the land by rapid decomposition of the straw.

A further object of our invention is the provision of a device of the class described which is relatively inexpensive to produce, is relatively light in weight, simple and durable in construction and provides a maximum of safety.

The above and still further objects and advantages of our novel structure will become apparent from the following detailed specification, appended claim and attached drawings.

Referring to the drawings, wherein like characters indicate like parts throughout the several views:

Fig. 3 is an enlarged view in bottom elevation taken substantially on the line 3—3 of Fig. 2; and Fig. 4 is an enlarged view in top elevation taken substantially on the line 4—4 of Fig. 2.

Figure 2:
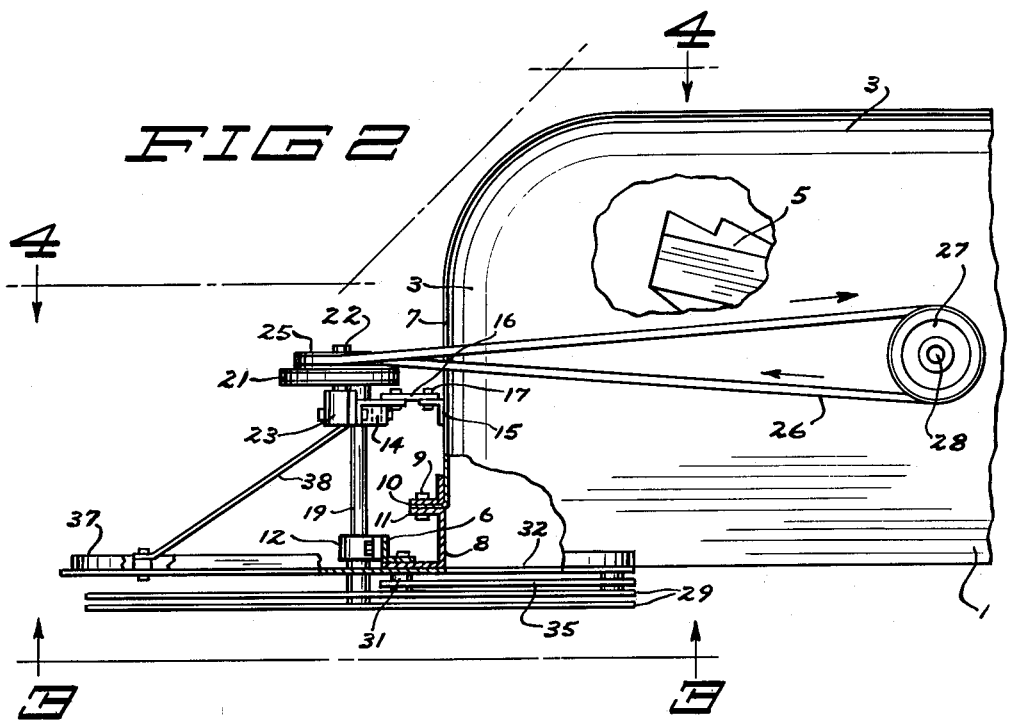
Fig. 2 is a view in side elevation of the structure of Fig. 1, some parts being broken away.

Referring with greater particularity to the drawings, the numeral 1 indicates in its entirety a combine including wheels 2 and a straw discharge chute 3 which, as shown in Figs. 3 and 4, is provided with an opening 4 at its bottom. Within the combine and feeding straw into the discharge chute 3 is a jumper-type conveyor mechanism 5, see particularly Figs. 2 and 3. Mechanism 5 is designed to deposit the straw over the discharge opening 4.

For the purpose of cutting up the straw discharged through the opening 4 of chute 3, and broadcasting same over a relatively wide area, we provide an elongated cross-sectionally L-shaped frame member 6 which is adapted to be secured transversely across the rear end 7 of the chute 3 by means of L-shaped mounting brackets 8. Note that nut-equipped bolts 9 project through rearwardly projected lip 10 on the bottom of the rear end portion 7 of chute 3 and the rearwardly projected portion 11 of the L-shaped mounting brackets 8. A pair of laterally spaced bearing caps 12 are secured to the frame member 6 by means of nut-equipped bolts or the like 13. Overlying the frame member 6 in spaced relationship thereto is another elongated cross-sectionally L-shaped frame member 14 which is likewise secured to the rear end 7 of the chute 3 by any suitable means such as the mounting bracket 15 connecting straps 16 and bolts 17. Frame member 14 is likewise provided with a pair of bearing caps 18 which are in vertical alignment with bearing caps 12. Journalled for rotation in the aligned bearing caps 12 and 18 are a pair of laterally spaced vertical drive shafts 19. Mounted on the upper ends of shafts 19 for common rotation therewith are sheaves or pulleys 20. An enlarged idler pulley 21 is mounted on a vertical stub shaft 22 mounted for rotation in a bearing 23 on one outer end of frame member 14. A V-belt or the like 24 runs over the sheaves 20 and over the idler pulley 21 so as to impart rotary movements to the drive shafts 19 in opposite directions. Also mounted on the stub shaft 22 for common rotation with pulley 21 is a pulley 25 which is of somewhat smaller diameter than pulley 21 but of larger diameter than pulley 20. The V-belt or the like 26 runs over the pulley 25 and over a drive pulley 27 mounted on a power shaft 28 projecting laterally from one side of the combine 1.

Figure 1:
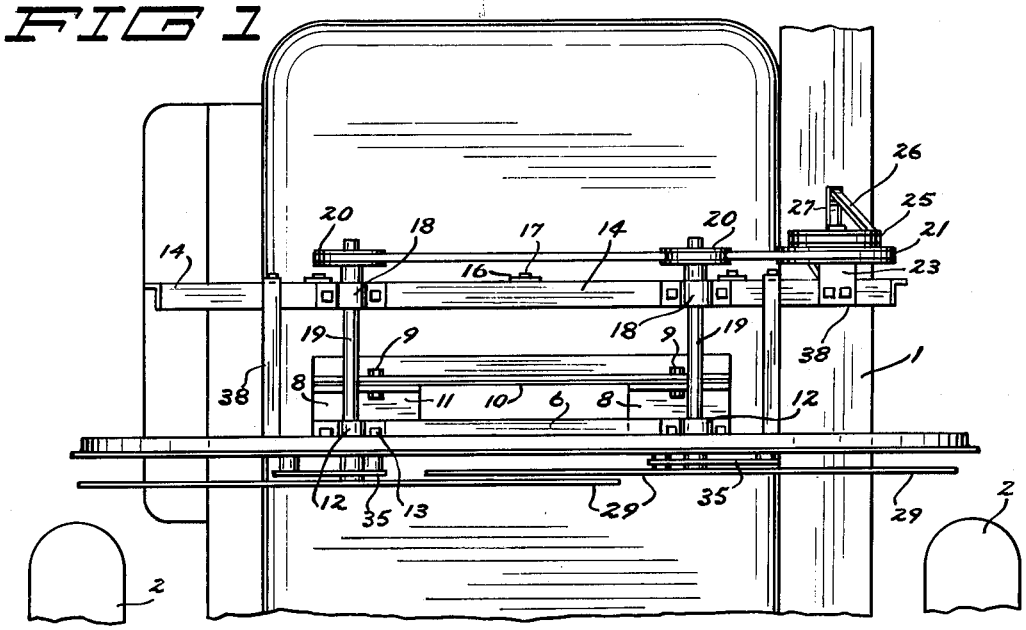
Fig. 1 is a fragmentary view in rear elevation of a combine with our novel cutting attachment secured thereto.

Rigidly secured to the lower ends of drive shafts 19, in vertically staggered relationship, are a pair of rotary cutting knives 29. As shown particularly in Fig. 3, cutting knives 29 are generally S-shaped so as each is provided with twin cutting faces 30. The arcuate cutting faces 30 extend generally radially outwardly and rearwardly with respect to the direction of rotation. Also as shown in Fig. 1 the purpose of vertically staggering the rotary knives 29 is to permit rotation in overlapping planes.

Secured to the frame member 6 by means of nut-equipped bolts or the like 31 in immediately overlying relationship to the cutting knives 29 is a guard plate 32 which extends rearwardly beyond the sweep of the knives 29 and has an opening in its forward edge corresponding to the shape of the straw discharge chute 3 so as to expose the knives 29 immediately below the opening 4 in the chute 3.

Secured to opposite side edges 33 of the guard plate 32, preferably and as shown by means of rivets or the like 34, are shear blades 35, each of which is in vertically spaced relationship to its cooperating knives 29. Preferably and as shown, the shear blades 35 have toothed concave cutting edges 36, the arcs of which correspond roughly to those of the cutting edges 30 of the rotary knives 29. Preferably and as shown, the guard plate 32 is provided with an upstanding flange 37 adjacent its peripheral edge for the purpose of imparting rigidity thereto. Also preferably and as shown laterally spaced reinforcing straps 38 extend from the upper frame member 14 downwardly and rearwardly to the outer portion of the guard plate 32. As shown in Fig. 3 the knives 29 are arranged to rotate in opposite directions each in the direction of its cooperating shear blade 35.

It should be obvious from the above that as the straw is discharged from the conveyor 5 it drops vertically through the chute 3 and out through the opening 4 therein—at which point it comes into contact with the reversely-rotating vertically-staggered rotary knives 29 and portions thereof are caused to impinge upon the serrated or toothed shear blades 35. This results in the straw being chopped into relatively small lengths and broadcast over a wide area in uniform thickness. Furthermore, and of great importance, is the fact that the shear blades 35 are vertically spaced from their cooperating knives 29 so as to prevent a clean cutting of the straw. Rather the straw is roughly torn and shredded. As above indicated, roughly torn and shredded straw decomposes much more rapidly than does the straw which is cleanly cut.

While we have shown a commercial embodiment of our invention, it should be obvious that same is capable of modification without departure from the spirit and scope of the invention, as defined in the appended claim.

What we claim is:

A straw cutting attachment for combines having a downwardly opening straw discharge chute, said attachment comprising a mounting frame, a pair of laterally spaced vertical drive shafts journalled for rotation in said frame, cutting knives fast on the lower ends of said shafts, a horizontally disposed guard plate secured to said frame in overlying relationship to said cutting knives, said guard plate extending rearwardly beyond the sweep of said knives and having an opening in its forward edge exposing an area of the sweep of said knives, a pair of opposed shear blades secured to the guard plate on opposite sides of said opening, means on said shafts above said guard plate for rotating said shafts in opposite directions whereby the cutting edges of said knives will be caused to move in the direction of their cooperating shear blades, and means on said frame for securing said attachment to the rear end portion of a straw discharge chute with the opening in said guard plate aligned with the opening in said chute, said rotary knives being generally S-shaped and being vertically staggered with respect to each other so as to permit independent rotation in overlapping planes, the cutting edges of said knives extending outwardly and rearwardly with respect to the direction of rotation thereof, said shear blades having concave toothed edges the arcs of which correspond roughly to those of the cutting edges of their cooperating knives.

References Cited in the file of this patent

UNITED STATES PATENTS

| | | |
|---|---|---|
| 349,607 | Reeder | Sept. 21, 1886 |
| 1,244,288 | Bueker | Oct. 23, 1917 |
| 1,744,597 | Vasconcellos | Jan. 21, 1930 |
| 2,280,677 | Wagner et al. | Apr. 21, 1942 |
| 2,281,846 | Klein | May 5, 1942 |